Dec. 10, 1935. R. H. CARTER 2,023,950
ANIMAL TRAINING DEVICE
Filed June 8, 1934 2 Sheets-Sheet 1
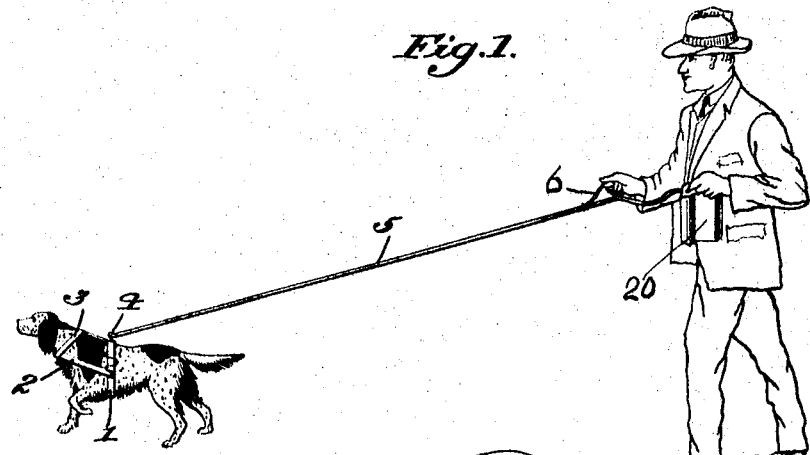
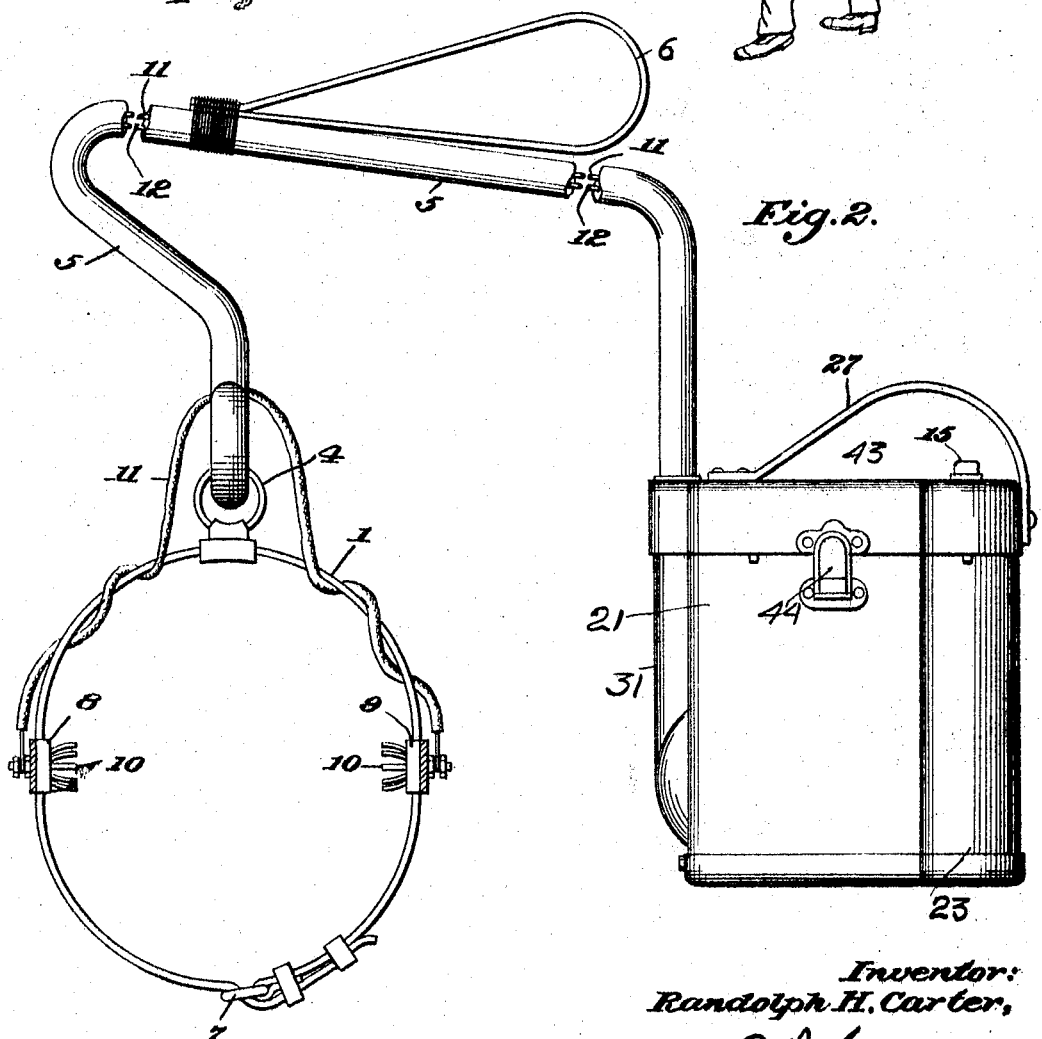
Inventor:
Randolph H. Carter,
A. P. Greeley
Att'y.

Dec. 10, 1935.                    R. H. CARTER                    2,023,950
                              ANIMAL TRAINING DEVICE
                              Filed June 8, 1934           2 Sheets-Sheet 2
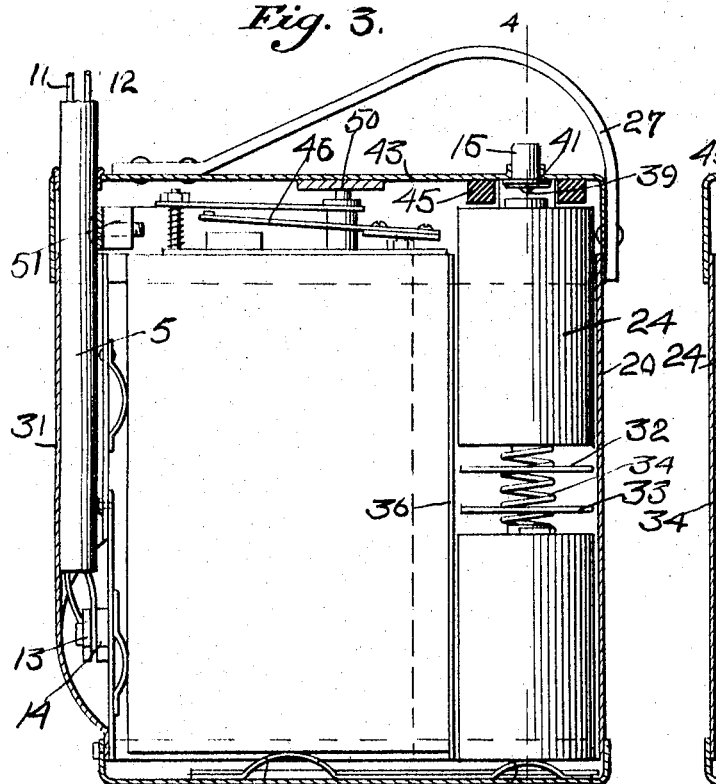
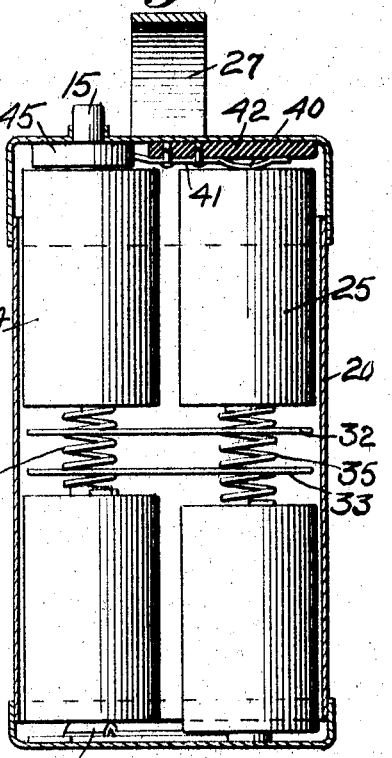
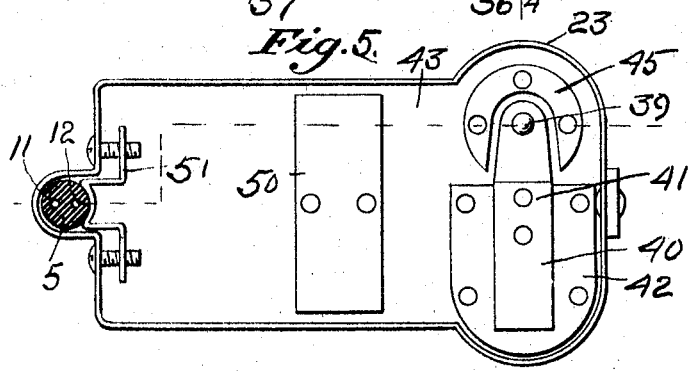
Inventor:
Randolph H. Carter,
A. P. Greeley
Att'y.

Patented Dec. 10, 1935

2,023,950

UNITED STATES PATENT OFFICE 2,023,950

ANIMAL TRAINING DEVICE

Randolph Hicks Carter, Warrenton, Va.

Application June 8, 1934, Serial No. 729,696

3 Claims. (Cl. 175—311)

My invention relates to devices for training animals and has for its object means adapted for field use by which an electric shock may be imparted to the animal to be trained. A further object of my invention is to provide a generator adapted for imparting an electric shock to the animal at a considerable distance from the trainer. A further object of my invention is to provide a simple, inexpensive and efficient electric generator of such weight as to be readily carried by the hand of the trainer.

With the objects above indicated and other objects hereinafter explained in view my invention consists in the construction and combination of elements hereinafter described and claimed.

Referring to the drawings:

Figure 1 is a view showing the device of my invention in use.

Figure 2 is a view of my device complete.

Figure 3 is a longitudinal central vertical sectional view of the device.

Figure 4 is a cross sectional view on line 4—4 of Figure 3, and

Figure 5 is a plan view of the under face of the cover.

In the drawings I indicates a harness belt adapted to be secured on the body of the dog back of his fore legs and held in place by breast strap 2 and neck strap 3. Belt I has at a point immediately above the backbone of the dog an eye 4 to which is secured the front end of leash 5 preferably provided with hand loop 6.

The ends of harness belt I are secured together by buckle 7. Midway between eye 4 and buckle 7 on each side of the belt is arranged a contact 8, 9, preferably having points 10 sharp enough to readily pass through the fur of the dog so as to reach his skin but not sharp enough to be felt under ordinary conditions. To each of the contacts 8 and 9 is secured a conducting wire, wire 11 leading from contact 8 and wire 12 leading from contact 9. These wires are carried by leash 5 and at their rear ends are in circuit with the terminals 13, 14, of a generating device carried by the master of the dog, and having a circuit closing button 15 so arranged that when this circuit closing button is pressed an electrical impulse will pass between contacts 8 and 9, thus giving the dog a shock sufficient to cause him to obey a word of command or to take some desired action on hearing a particular warning sound.

A particular use of the device is in teaching a dog to stop or to move out of danger when he hears an automobile approaching.

While any generator adapted to produce a momentary current sufficient to pass from contact 8 to contact 9 may be used, I have found satisfactory for this purpose the device illustrated in which 20 indicates an outer casing having the forward portions 21, 22, flat and having the rear portions 23 of its side bulged out so as to form a chamber adapted to receive two flash light batteries 24, 25, each of which is here shown as comprising two cells with plates 32, 33, and springs 34, 35, between them, these springs forming part of the battery circuit and by their resilience presenting movement of the cells within the chamber. Battery 24 rests on control 36 which is in circuit with control 37 on which rests the terminal of the primary circuit of a spark coil of usual construction such as is used in Ford automobiles, the upper end of the upper cell of this battery being directly below the point 39 of push button 15. The other terminal of the primary coil of the spark coil is in circuit through contacts corresponding to contacts 37, 36, with the lower end of the lower cell of battery 25. At its upper end battery 25 is in circuit with contact 40 on the underside of spring 41 which carries on its free end push button 15. Spring 41 is carried by block 42 of non-metallic material which is carried on the under face of cover 43 which is held on the casing by catches 44. A carrying strap 27 is secured to cover 43 and extends over the push button. A horseshoe shaped strap of non-metallic material 45 on the under face of cover 45 extends about the inner end of button 15.

46 indicates the usual interrupter for the secondary circuit of the spark coil and, of course, the terminals of the secondary coil are in contact with terminals 13, 14.

50 indicates a plate of non-metallic material on the under side of cover 43 bearing on the spark coil to hold it in position. 51 indicates a clamp for holding the inner end of leash 5 securely to the casing which carries the battery and spark coils.

In use this harness consisting of the belt, breast strap and neck strap, is secured on the dog, or other animal to be trained and the dog is allowed to move forward, the trainer carrying the casing containing the spark coil and batteries following at the end of the leash. When the attention of the animal is to be directed to a particular sound such as the noise of an oncoming automobile or, it may be, a particular word of command, the trainer by pressing on push button 15 closes circuit from the batteries through the primary of the spark coil generating a high tension current momentarily in the secondary and through wires 11, 12, the impulse similar to though of less voltage than the igniting spark of the spark coil of the automobile, is transmitted to the animal, giving him a slight electric shock, calling attention to the noise of the automobile, word of command, or other matter which he is to learn to give attention to. The purpose is to teach the dog to associate the particular noise or the particular command with a slight shock and particularly to teach him that if he gives proper attention to the particular noise or word of command, he will receive no shock.

It is, of course, to be understood that the device may be made use of in training other animals than dogs.

Having thus described my invention, what I claim is:

1. In a device for training animals the combination with a harness adapted to be secured to the animal and carrying terminal points spaced apart and so arranged as to contact with the animal, means secured to the harness for physically restraining movement of the animal, conductors carried by the movement restraining means leading to said terminals, a portable generator of current and means for closing circuit from the generator through the conductors to the terminals carried by the harness.

2. In a device for training animals the combinations with a harness adapted to be secured to the animals and comprising a belt and a breast strap and carrying terminal points spaced apart and so arranged as to contact with the animal, a leash secured to the harness for physically restraining movement of the animal carrying conductors leading to said terminals, a portable generator of current and means for closing circuit from the generator through the conductors to the terminals carried by the harness.

3. In a device for training animals the combinations with a harness adapted to be secured to the animals and comprising a belt and a breast strap and carrying terminal points spaced apart and so arranged as to contact with the animal, a leash secured to the harness for physically restraining movement of the animal carrying conductors leading to said terminals and having its free end adapted to be held by one hand of a trainer, a portable generator of current adapted to be held by the other hand of the trainer, and means for closing circuit from the generator through the conductors to the terminals carried by the harness.

RANDOLPH HICKS CARTER.